Figure 1:
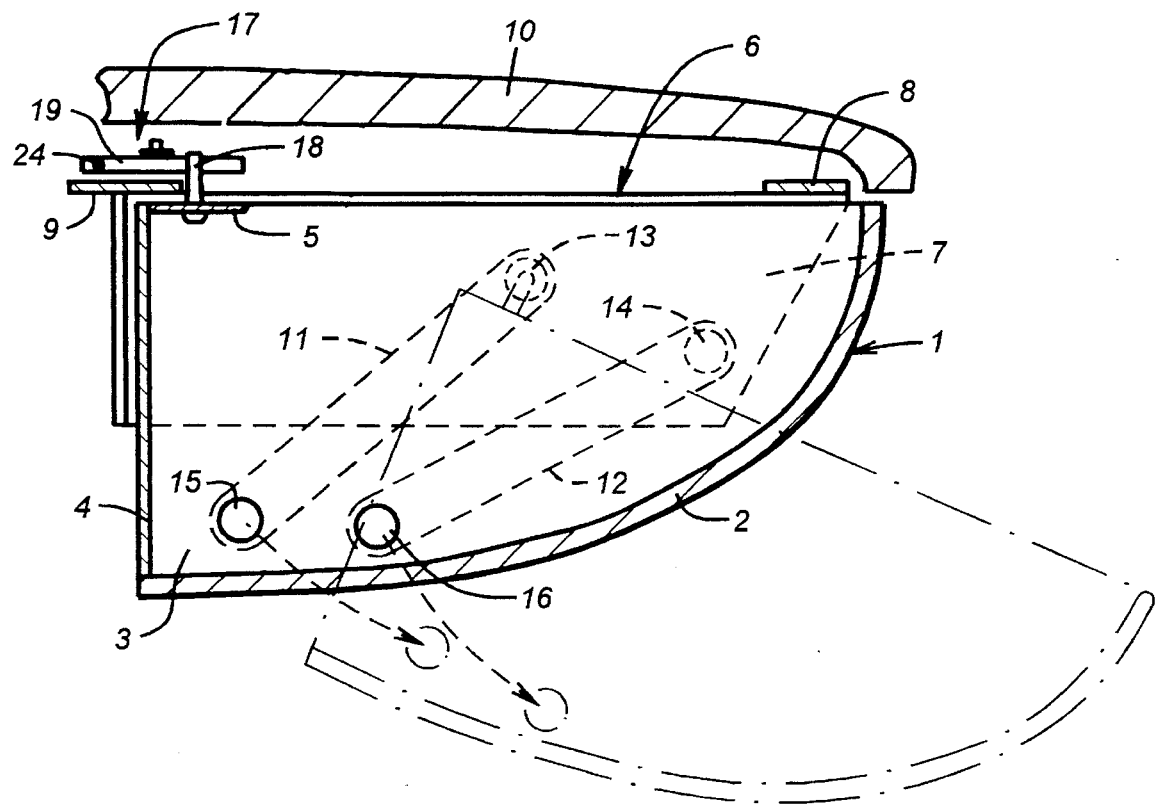

United States Patent [19]
Gross et al.

[11] Patent Number: 5,558,385
[45] Date of Patent: Sep. 24, 1996

[54] MOVABLE GLOVE COMPARTMENT HAVING A REAR MOUNTED, REMOTELY ACTUATED LOCK

[75] Inventors: Helmut Gross, Winnenden; Martin Leilich; Hans Zuschanko, both of Neckarsulm, all of Germany

[73] Assignee: Audi AG, Germany

[21] Appl. No.: 244,443

[22] PCT Filed: Dec. 2, 1992

[86] PCT No.: PCT/EP92/02781

§ 371 Date: Jun. 2, 1994

§ 102(e) Date: Jun. 2, 1994

[87] PCT Pub. No.: WO93/11968

PCT Pub. Date: Jun. 24, 1993

[30] Foreign Application Priority Data

Dec. 14, 1991 [DE] Germany ............... 41 41 239.7

[51] Int. Cl.$^6$ .................................................. B60R 7/06
[52] U.S. Cl. ..................... 296/37.12; 70/256; 70/258
[58] Field of Search ........................ 296/37.7, 37.8, 296/37.9, 37.12; 224/273, 277, 282, 311, 400; 70/237, 256, 258

[56] References Cited

U.S. PATENT DOCUMENTS 4,630,857  12/1986  Zweiniger et al. ............ 296/37.12
4,886,311  12/1989  Trube et al. ................... 296/37.12

FOREIGN PATENT DOCUMENTS

| 184620 | 6/1986 | European Pat. Off. . |
| 1655631 | 2/1971 | Germany . |
| 1955057 | 6/1977 | Germany . |
| 3301442 | 7/1984 | Germany . |
| 2941243 | 8/1984 | Germany . |
| 35 14 605.6 | 7/1985 | Germany . |
| 3408978 | 7/1988 | Germany . |
| 3739921 | 6/1989 | Germany . |
| 3905256 | 9/1989 | Germany . |
| 3816407 | 11/1989 | Germany . |
| 3926425 | 9/1990 | Germany . |

*Primary Examiner*—Andrew C. Pike
*Attorney, Agent, or Firm*—Rosenblatt & Redano P.C.

[57] ABSTRACT

A movable glove compartment for a motor vehicle has a locking device fitted to the rear portion, and a locking device adapted for use in the rear portion of a glove compartment. Use of the locking device in the rear portion eliminates safety hazards associated with protrusions of locking device components from the exposed portions of the glove compartment, improves esthetics, and allows the entire exposed face of the glove compartment to be cushioned.

19 Claims, 1 Drawing Sheet

MOVABLE GLOVE COMPARTMENT HAVING A REAR MOUNTED, REMOTELY ACTUATED LOCK

The invention concerns a movable glove compartment for a motor vehicle.

With this type of glove compartment, e.g., the type known from German Patent 3932425 the locking part of the closing device is located at the upper edge and on the inside of the front part of the glove compartment and may be activated by a handle located on this front part, while the latching part designed in the form of a U-shaped bar is fastened to a stationary frame attached to the dashboard. Since the latching part and/or the locking part must protrude from the structural part that supports them to enable an interaction, there is a danger that the user will injure himself on the protruding parts and that objects kept in the glove compartment would get caught on these protruding parts. The fact that the handle fitted to the front part of the glove compartment to activate the lock is made of a relatively hard material in contrast to the front part itself that is made of a cushioning material for safety reasons also causes problems, because it can lead to injuries in case of an impact. And finally, the fact that the locking part and/or the latching part are visible when the glove compartment is open is not very pleasing from an esthetic point of view.

The task of the invention consists of the development of a glove compartment of said type, whose use prevents the danger of sustaining an injury.

With this invention, this task is solved by the features described below.

Because the locking unit is not fitted to the front edge of the glove compartment, as is commonly the case, but to its rear area, there is no danger that the user can injure himself on the protruding parts of the locking device, since it is impossible for him to come into contact with parts fitted to the rear area of the glove compartment. In the proposed arrangement of the locking device, said device will not be visible when the glove compartment is open, thus improving the esthetics. Because the movable part of the locking device is operated remotely, there is no need for a handle in the front part of the glove compartment; this presents advantages not only from an esthetic point of view, but also with respect to safety, because the whole front part can now be made of a cushioning material.

Preferably, the latching part is fitted to the center of the rear section of the glove compartment. It may consist of a locking bolt that interacts with a hook forming the locking device that by means of a spring may be moved to a position required to release the locking bolt; the area that comes into contact with the locking device when the glove compartment is closed consists of an inclined surface that by interaction with the locking bolt moves the hook against the force of the spring until the locking pin catches the hook.

The remote operation of the locking device may be achieved with a pulling cable that ends at the dashboard and has an operating knob. As an alternative, the remote operation may be obtained with a solenoid that may be triggered by closing a switch located on the dashboard, thus rotating the locking device into the release position.

Figure 2:
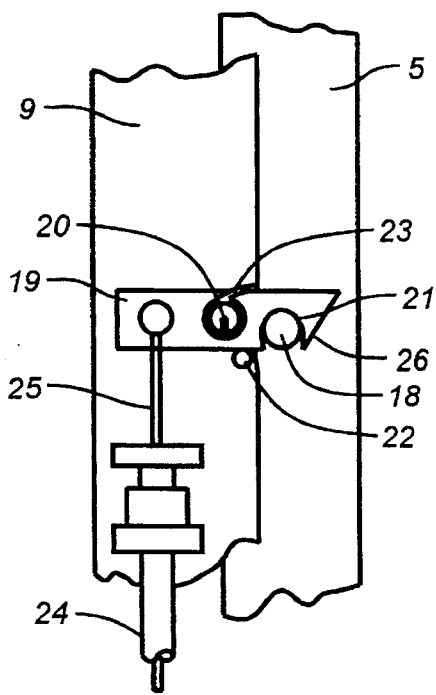
Figure 3:
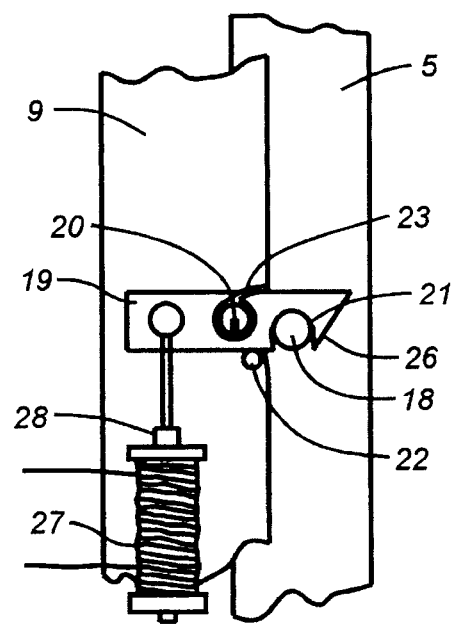

A design example for this invention is described in the following with the help of the drawings. They show the following:

FIG. 1 A cross section through a glove compartment installed in the dashboard of a motor vehicle, FIG. 2 a top view of the locking device for the glove compartment shown in FIG. 1, and FIG. 3 a top view of the locking device for the glove compartment show in FIG. 1 depicting an embodiment in which a solenoid is used for remote actuation.

FIG. 1 shows glove compartment 1, exhibiting floor 2 that also forms the front part, side walls 3, a rear wall 4, and stem 5 at the upper edge of the rear wall. Glove compartment 1 rotates and moves in frame 6 fitted with lateral plates 7 and stems 8,9 that connect them. Frame 6 is attached to the dashboard, of which only cover plate 10 is shown. The connection between glove compartment I and lateral plates 7 of frame 6 is achieved on each side by two levers 11 and 12 that rotate at 13 or 14 with respect to lateral plate 7 and rotate at 15 and 16 with respect to side wall 3 of glove compartment 1.

In the open position, glove compartment 1 occupies the position indicated with a dotted line.

Glove compartment 1 is kept in the closed position by locking device 17 that in the design example consists of locking pin 18 and interacting rotating hook 19. Locking pin 18 that forms the latching part is fastened to stem 5 at the rear upper end of glove compartment 1 and extends to the top. Hook 19 that forms the locking part to be activated rotates about pivot 20 and is attached to stem 9 of frame 6. It has recess 21, into which locking bolt 18 catches as indicated in FIG. 2. Spring 23 holds hook 19 in its shown locking position. Stop 22 limits the rotating motion of hook 19 moved by spring 23. Hook 19 by means of remote activation and against the force of spring 23 may be brought into a position that releases locking bolt 18. In the design example, said remote activation is achieved by means of Bowden cable 24, whose pulling cable 25 has hook 19 at one end and an activation knob at the other end on the dashboard and within reach of the driver. When pulling cable 25 is pulled, locking bolt 18 is released and glove compartment 1 by means of gravity or by a spring or against the force of a damper may reach the position indicated in FIG. 1 as a dotted line. When glove compartment 1 is closed again, locking bolt 18 comes into contact with inclined surface 26 at the front end of hook 19, in which case hook 19 is rotated against the force of spring 23 until locking bolt 18 latches into recess 21.

It is only natural that there are many deviations from the presented design example that remain within the scope of the invention. The remote activation of hook 19, for example, may also be obtained with the help of a solenoid 27, whose anchoring device 28 is attached to hook 19 and may be triggered by means of a switch located on the dashboard, thus rotating hook 19 in the described manner against the force of spring 23 to reach the release position.

The invention is not restricted to a glove compartment with a four-hinge support, but also applies to a glove compartment that only slides as described in German Patent 700572 for example or a glove compartment that only rotates as described in German Patent 3311169 for example.

Furthermore, the invention applies not only to the locking device shown here; said arrangement of a hook and locking pin was shown only for its simplicity.

We claim:

1. A movable glove compartment assembly for use in a motor vehicle comprising:

a glove compartment movably engaged with a dashboard in said motor vehicle;

a latching device positioned at a rear portion of said glove compartment; and a locking device mechanically engaged with said dashboard adjacent to said rear portion of said glove compartment, said locking device adapted for mechanical engagement with said latching device and remotely actuatable to release said latching device.

2. The glove compartment assembly of claim 1, further comprising:
a frame supported by the dashboard and adapted to be movably engaged by said glove compartment.

3. The glove compartment assembly of claim 2, wherein said latching device comprises a locking bolt and said locking device comprises a rotating hook pivotally engaged with said frame and adapted for mechanical engagement with said locking bolt in a first position.

4. The glove compartment assembly of claim 3, wherein said hook is biased toward said first position regardless of wherein said hook is engaged with said locking bolt, said hook further comprising means to overcome said bias to permit said hook to reengage said locking bolt by moving to a second position.

5. The glove compartment assembly of claim 4, wherein said means to overcome said bias comprises an inclined surface adapted to interact with said locking bolt to overcome said bias.

6. The glove compartment assembly of claim 5, wherein said bias is applied by a spring.

7. The glove compartment assembly of claim 4, wherein said locking device is mechanically engaged with an anchoring device and is adapted for remote actuation by a solenoid whereby said locking device is biased to rehearse said latching device.

8. The glove compartment assembly of claim 1, wherein said latching device comprises a locking bolt and said locking device comprises a hook pivotally engaged in connection with said dashboard and adapted for mechanical engagement with said locking bolt in a first position.

9. The glove compartment assembly of claim 8, wherein said hook is biased toward said first position regardless of whether said hook is engaged with said locking bolt, said hook further comprising means to overcome said bias to permit said hook to reengage said locking bolt by moving to a second position.

10. The glove compartment assembly of claim 9, wherein said means to overcome said bias comprises an inclined surface adapted to interact with said locking bolt to overcome said bias.

11. The glove compartment assembly of claim 10, wherein said bias is applied by a spring.

12. The glove compartment assembly of claim 9, wherein said locking device is mechanically engaged with a cable extending to a remote location for operation from said remote location to bias said locking device to release said latching device.

13. The glove compartment assembly of claim 1, further comprising:
a solenoid for remote actuation of said locking device.

14. A movable dashboard-mounted glove compartment assembly for use in a motor vehicle comprising:
a frame attached to a dashboard in said motor vehicle;
a glove compartment having a rear portion and movable engaged with said frame;
a latching device comprising a locking bolt positioned as said rear portion of said glove compartment; and
a hook pivotally engaged with said frame and biased to mechanically engage said locking bolt, said hook being remotely actuatable to release said locking bolt.

15. A dashboard-mounted glove compartment and lock mechanism combination comprising:
a glove compartment having open and closed positions;
a latch mounted to the glove compartment; and
a locking member selectively engaging said latch for opening and keeping said glove compartment closed with respect to a dashboard;
said glove compartment having an exposed face from the dashboard when in its said closed position;
said latch and said locking member having none of their components mounted in or adjacent said exposed face.

16. The combination of claim 15, wherein:
said locking member further comprises a cable actuator mounted remotely from said exposed face.

17. The combination of claim 15, wherein:
said locking member is remotely actuated to pivot;
said latch comprises a detent on said glove compartment; and
said locking member comprises a hook to selectively retain said detent.

18. The combination of claim 17, wherein:
said hook is actuated by solenoid to release said detent.

19. The combination of claim 18, wherein:
said hook is biased toward said detent for maintaining said glove compartment closed; and
said solenoid swings said hook for release of said detent;
said hook having an inclined surface that by interaction with said detent moves said hook against said bias upon closing movement of said glove compartment.

* * * * *